United States Patent
Ota

(10) Patent No.: US 11,041,554 B2
(45) Date of Patent: Jun. 22, 2021

(54) FEED MECHANISM

(71) Applicant: FUJIFILM Corporation, Tokyo (JP)

(72) Inventor: Kohei Ota, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 287 days.

(21) Appl. No.: 16/050,352

(22) Filed: Jul. 31, 2018

(65) Prior Publication Data

US 2019/0063570 A1 Feb. 28, 2019

(30) Foreign Application Priority Data

Aug. 30, 2017 (JP) .............................. JP2017-165263

(51) Int. Cl.
| | | |
|---|---|---|
| *F16H 25/20* | (2006.01) | |
| *F16H 25/24* | (2006.01) | |
| *G03B 42/02* | (2021.01) | |
| *G03B 42/08* | (2021.01) | |
| *G02B 21/36* | (2006.01) | |

(52) U.S. Cl.
CPC ............. *F16H 25/24* (2013.01); *F16H 25/20* (2013.01); *G03B 42/02* (2013.01); *G03B 42/08* (2013.01); *F16H 2025/204* (2013.01); *F16H 2025/2445* (2013.01); *G02B 21/362* (2013.01)

(58) Field of Classification Search
CPC .... F16H 25/24; F16H 25/20; F16H 2025/204; F16H 2025/2445; F16H 25/2006; F16H 25/2009; F16H 2025/2012; G03B 42/02; G03B 42/08; G02B 21/362
See application file for complete search history.

(56) References Cited

U.S. PATENT DOCUMENTS

| | | | | |
|---|---|---|---|---|
| 5,906,136 A | * | 5/1999 | Yabe | .................. F16C 33/3713 277/562 |
| 6,311,575 B1 | * | 11/2001 | Erker | ...................... F16H 25/24 74/89.36 |
| 2008/0210039 A1 | * | 9/2008 | Brun | ...................... F16H 25/229 74/424.94 |
| 2009/0199665 A1 | | 8/2009 | Tappan | |

(Continued)

FOREIGN PATENT DOCUMENTS

| | | |
|---|---|---|
| DE | 102009036886 A1 | 2/2011 |
| EP | 2484936 A1 | 8/2012 |

(Continued)

OTHER PUBLICATIONS

Extended European Search Report dated Jan. 15, 2019, for corresponding European Application No. 18185422.5.

(Continued)

*Primary Examiner* — Randell J Krug
(74) *Attorney, Agent, or Firm* — Birch, Stewart, Kolasch & Birch, LLP

(57) ABSTRACT

A feed mechanism, which is capable of suppressing feed irregularity caused by the inclination of a nut of a feed screw, is obtained. A feed mechanism (sub-scanning mechanism) includes a feed screw that includes a screw shaft and a nut and a moving body, and the nut is moved on the screw shaft by a rotation of the screw shaft, so that the moving body is moved in the direction of the screw shaft. The inclination of the moving body with respect to the nut is allowed in a case in which the moving body is moved by a movement of the nut.

16 Claims, 12 Drawing Sheets

(56) References Cited

U.S. PATENT DOCUMENTS

| | | | | |
|---|---|---|---|---|
| 2010/0232014 A1* | 9/2010 | Huang | ............... | F16H 25/2009 |
| | | | | 359/399 |
| 2012/0090418 A1 | 4/2012 | Barthlein et al. | | |
| 2012/0174691 A1* | 7/2012 | Yamada | .............. | F16H 25/2261 |
| | | | | 74/89.23 |
| 2015/0176629 A1 | 6/2015 | Tachiiwa | | |

FOREIGN PATENT DOCUMENTS

| FR | 2079668 A5 | | 11/1971 |
|---|---|---|---|
| JP | 7-7833 U | | 2/1995 |
| JP | 2009-092129 A | | 4/2009 |
| JP | 2009092129 A | * | 4/2009 |
| JP | 2011-69449 A | | 4/2011 |

OTHER PUBLICATIONS

Japanese Office Action, dated Jul. 14, 2020, for Japanese Application No. 2017-165263, with an English machine translation.
Japanese Office Action for corresponding Japanese Application No. 2017-165263, dated Feb. 9, 2021, with English translation.

* cited by examiner

FEED MECHANISM

CROSS-REFERENCE TO RELATED APPLICATIONS

The present application claims priority under 35 U.S.C. § 119 to Japanese Patent Application No. 2017-165263, filed on Aug. 30, 2017. Each of the above application(s) is hereby expressly incorporated by reference, in its entirety, into the present application.

BACKGROUND OF THE INVENTION

1. Field of the Invention

The present invention relates to a feed mechanism.

2. Description of the Related Art

A feed mechanism that linearly moves a moving body by a feed screw including a screw shaft and a nut has been known in the past (for example, JP2009-92129A).

SUMMARY OF THE INVENTION

However, a nut may be inclined with respect to a screw shaft in a case in which the nut is moved on the screw shaft. For this reason, in a case in which the moving body is fixed to the nut as in the technique disclosed in JP2009-92129A, the inclination of the nut is transmitted to the moving body as it is. Accordingly, the accuracy of the feed position of the moving body deteriorates and feed irregularity occurs.

An object of the invention is to obtain a feed mechanism that can suppress feed irregularity caused by the inclination of a nut of a feed screw.

A feed mechanism of a first aspect comprises a feed screw that includes a screw shaft and a nut and a moving body, and the nut is moved on the screw shaft by a rotation of the screw shaft, so that the moving body is moved in a direction of the screw shaft. The moving body or the nut includes a convex portion, and the moving body is pushed by the nut through only the convex portion to allow an inclination of the moving body with respect to the nut in a case in which the moving body is moved by a movement of the nut.

In this aspect, the feed mechanism includes the feed screw and the moving body. Further, the nut is moved on the screw shaft by the rotation of the screw shaft, so that the moving body is moved in the direction of the screw shaft. Here, the moving body or the nut includes the convex portion, and the moving body is pushed by the nut through only the convex portion and the inclination of the moving body with respect to the nut is allowed in a case in which the moving body is moved by the movement of the nut. For this reason, even in a case in which the nut is inclined during the movement of the nut on the screw shaft, the influence of the inclination of the nut on the moving body is suppressed. Accordingly, feed irregularity caused by the inclination of the nut of the feed screw can be suppressed.

According to a second aspect, in the feed mechanism according to the first aspect, a distance between a surface of the screw shaft and an apex of the convex portion is 5 mm or less.

In this aspect, since the distance between the surface of the screw shaft and the apex of the convex portion is 5 mm or less, it is difficult for the inclination of the nut to affect the moving body.

According to a third aspect, in the feed mechanism according to the first or second aspect, two convex portions are present and an imaginary straight line connecting the two convex portions passes through a center of the screw shaft.

In this aspect, the two convex portions are present. Further, the imaginary straight line connecting the two convex portions passes through the center of the screw shaft. For this reason, particularly, it is difficult for the inclination of the nut around the imaginary straight line, which connects the two convex portions, to affect the moving body.

According to a fourth aspect, in the feed mechanism according to the third aspect, the two convex portions are positioned so as to be symmetric with respect to the center of the screw shaft in a case in which the convex portions are viewed in an axial direction.

In this aspect, since the nut and the moving body act and react on each other at positions that are symmetric with respect to the center of the screw shaft in a case in which the convex portions are viewed in the axial direction, the inclination of the nut, which is caused by a reaction from the moving body, can be suppressed.

According to a fifth aspect, in the feed mechanism according to the third or fourth aspect, the moving body is a scanning unit, the scanning unit is moved in a sub-scanning direction by a movement using the feed screw, the scanning unit includes an optical head that is moved inside the scanning unit in a main scanning direction, and the two convex portions are positioned so as to be arranged in the main scanning direction.

In this aspect, it is possible to suppress lateral irregularity in a case in which an image is read by the scanning unit.

According to a sixth aspect, the feed mechanism according to any one of the first to fifth aspects further comprises an elastic body that makes an elastic force act in a direction where the nut and the moving body come into contact with each other at the convex portion.

In this aspect, the feed mechanism further comprises the elastic body and the elastic body makes an elastic force act in a direction where the nut and the moving body come into contact with each other at the convex portion. For this reason, since a state in which the nut and the moving body are in contact with each other at the convex portion is likely to be kept, it is possible to suppress an impact against the moving body that is caused in a case in which the nut comes into contact with the moving body from a state in which the nut is not in contact with the moving body.

According to a seventh aspect, in the feed mechanism according to the sixth aspect, the moving body includes a rotation-preventing shaft that prevents a rotation of the nut relative to the moving body and the elastic body is disposed around the rotation-preventing shaft.

In this aspect, the moving body includes the rotation-preventing shaft that prevents the rotation of the nut relative to the moving body and the elastic body is disposed around the rotation-preventing shaft. For this reason, the number of components can be made smaller than that in an aspect where components used to dispose the elastic body at a position separate from the rotation-preventing shaft are provided.

According to an eighth aspect, in the feed mechanism according to the seventh aspect, two rotation-preventing shafts are present and the two rotation-preventing shafts are provided so as to be symmetric with respect to a center of the nut.

In this aspect, the two rotation-preventing shafts, which are provided with the elastic bodies, are present and are provided so as to be symmetric with respect to the center of the nut. For this reason, since the elastic forces of the elastic bodies can be made to act on the nut and the moving body in balance, the relative postures of the nut and the moving body are stabilized.

According to a ninth aspect, the feed mechanism according to any one of the first to eighth aspects further comprises an elastic body that makes an elastic force act in a direction where the nut and the moving body come into contact with each other at the convex portion. Two convex portions are present, the two convex portions are positioned so as to be symmetric with respect to the center of the screw shaft in a case in which the convex portions are viewed in the axial direction, the moving body includes a rotation-preventing shaft that prevents a rotation of the nut relative to the moving body, the elastic body is disposed around the rotation-preventing shaft, two rotation-preventing shafts are present, the two rotation-preventing shafts are provided so as to be symmetric with respect to a center of the nut, and a direction in which the two convex portions are arranged and a direction in which the two rotation-preventing shafts are arranged cross each other.

In this aspect, the two elastic bodies are adapted to make elastic forces act in both two directions in which the nut is inclined while being in contact with the two convex portions (the directions of an inclination around an axis parallel to a direction in which the two convex portions are arranged). Accordingly, the angle of the nut with respect to the moving body is stabilized.

According to the invention, it is possible to suppress feed irregularity caused by the inclination of a nut of a feed screw.

DESCRIPTION OF THE PREFERRED EMBODIMENTS

An embodiment of the invention will be described.

An image reading device 110 of this embodiment can be used to be common to an autoradiographic image detection system, a chemiluminescence image detection system, an image detection system using an electron microscope, a radiation diffracted image detection system, a fluorescence image detection system, and the like.

Figure 12:
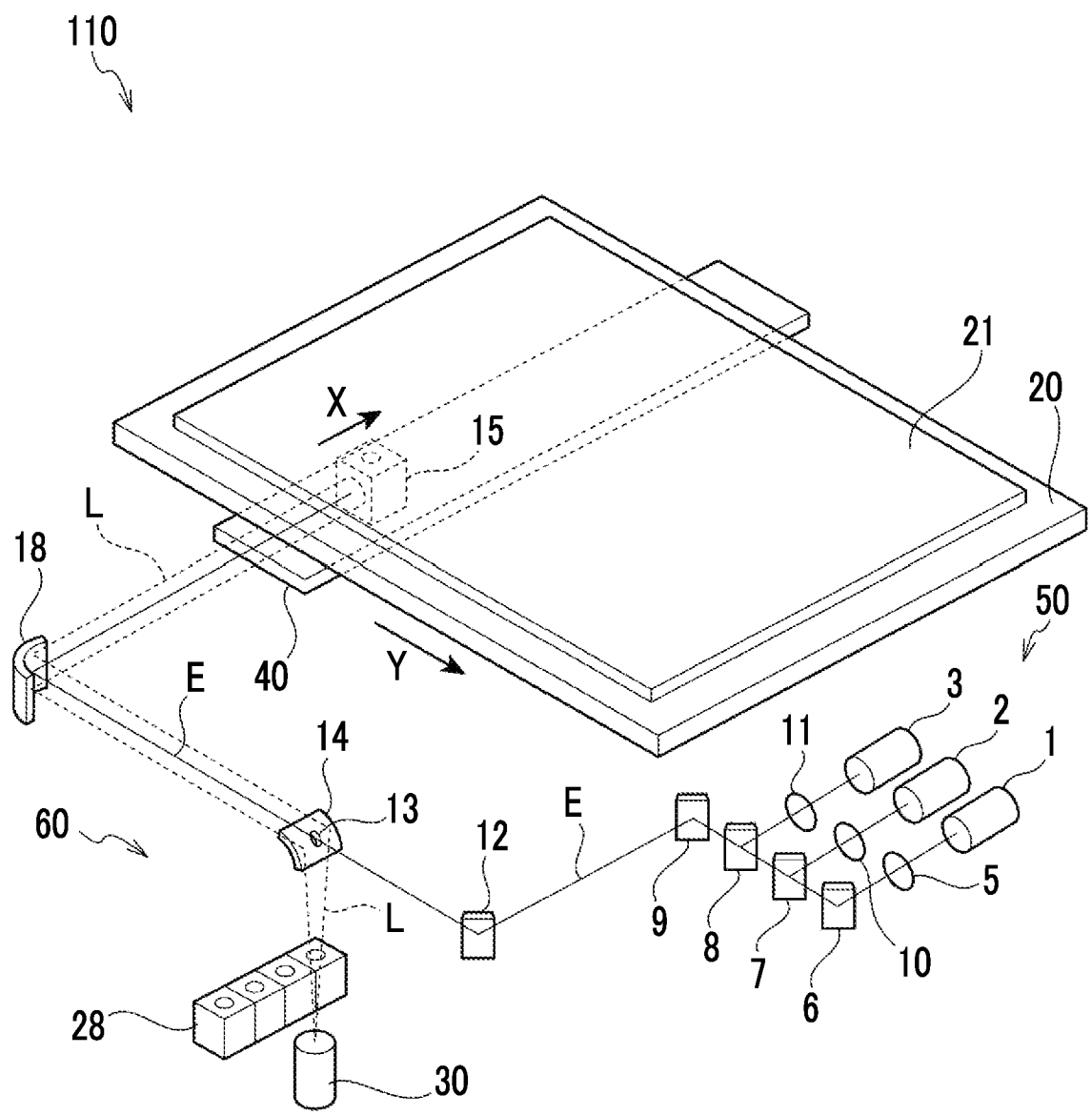
FIG. 12 is a perspective view showing the schematic structure of an image reading device of the embodiment.

FIG. 12 shows the schematic structure of an image reading device 110 of this embodiment. As shown in FIG. 12, the image reading device 110 includes a stage 20 on which an image carrier 21 is placed, an optical head 15 that irradiates the image carrier 21 with excitation light E and condenses luminescent light L emitted from the image carrier 21 excited by the excitation light E, a light source-optical system 50 that selectively generates the excitation light E, a photomultiplier 30 that is light detecting means for detecting the luminescent light L, and optical means 60 that guides light generated from the light source-optical system 50 to the optical head 15 and guides the luminescent light L to the photomultiplier 30.

The light source-optical system 50 includes a first laser excitation light source 1 that emits a laser beam E having a wavelength of 640 nm, a second laser excitation light source 2 that emits a laser beam E having a wavelength of 532 nm, and a third laser excitation light source 3 that emits a laser beam E having a wavelength of 473 nm. The first laser excitation light source 1 is formed of a semiconductor laser. Further, all of the second laser excitation light source 2 and the third laser excitation light source 3 are formed of a semiconductor laser and a second harmonic generation element. Further, the light source-optical system 50 includes: collimator lenses 5, 10, and 11 that change the laser beams E emitted from the plurality of excitation light sources 1, 2, and 3 to a parallel beam; and mirrors 6 and 9 and dichroic mirrors 7 and 8 that guide the laser beams E to the optical means 60.

After being changed to a parallel beam by the collimator lens 5, the laser beam E is generated by the first laser excitation light source 1 is reflected by the mirror 6. The first dichroic mirror 7 that transmits a laser beam E having a wavelength of 640 nm and reflects a beam having a wavelength of 532 nm and the second dichroic mirror 8 that transmits a beam having a wavelength of 532 nm or more and reflects a beam having a wavelength of 473 nm are provided on the optical path of the laser beam E that is generated from the first laser excitation light source 1. The laser beam E, which is generated by the first laser excitation light source 1 and is reflected by the mirror 6, is transmitted through the first and second dichroic mirrors 7 and 8 and is incident on the mirror 9.

On the other hand, after being changed to a parallel beam by the collimator lens 10, the laser beam E generated from the second laser excitation light source 2 is reflected by the first dichroic mirror 7 so that the direction of the laser beam E is changed by an angle of 90°, is transmitted through the second dichroic mirror 8, and is incident on the mirror 9.

In addition, after being changed to a parallel beam by the collimator lens 11, the laser beam E generated from the third laser excitation light source 3 is reflected by the second dichroic mirror 8 so that the direction of the laser beam E is changed by an angle of 90° and is incident on the mirror 9.

The laser beam E, which is incident on the mirror 9, is reflected by the mirror 9 and is incident on a mirror 12 of the optical means 60 to be described later.

The optical head 15 includes a concave mirror and an aspherical lens (not shown). The laser beam E, which is incident on the optical head 15, is reflected to the image carrier 21 by the concave mirror and is condensed on the image carrier 21, which is set on the stage 20, by the aspherical lens. The luminescent light L, which is emitted from the image carrier 21 through the irradiation of the laser beam E, is condensed by the aspherical lens, is incident on the concave mirror, and is further condensed by the concave mirror. In addition, the luminescent light L is reflected to the same side as the optical path of the laser beam E, is changed to a substantially parallel beam, and is incident on a concave mirror 18 of the optical means 60 to be described later.

The optical head 15 is can be moved on a substrate 40 in a main scanning direction (X direction). Further, the substrate 40 can be moved in a sub-scanning direction (Y direction) by a sub-scanning mechanism S1 to be described later. Accordingly, since the optical head 15 is moved on the substrate 40 in the main scanning direction X and the substrate 40 is moved in the sub-scanning direction Y, the optical head 15 can two-dimensionally scan the image carrier 21 in the X and Y directions and can read the entire surface of the image carrier 21. The image carrier 21 is, for example, an imaging plate, a material that is obtained from a living organism and is fluorescencely dyed, or the like.

The optical means 60 includes: a mirror 12; a punched mirror 14 that is formed of a concave mirror, allows the excitation light E and the luminescent light L to branch off and includes a hole 13 formed at the central portion thereof; a concave mirror 18; and a filter unit 28 that allows light to be selectively incident on the photomultiplier 30.

The laser beam E, which is reflected by the mirror 9 of the light source-optical system 50 and is incident on the mirror 12, is reflected by the mirror 12, passes through the hole 13 of the punched mirror 14, is incident on the concave mirror 18, is reflected by the concave mirror 18, and is incident on the optical head 15.

Further, the luminescent light L, which is emitted from the image carrier 21, is reflected by the concave mirror of the optical head 15, and is incident on the concave mirror 18, is reflected by the concave mirror 18 and is incident on the punched mirror 14.

The luminescent light L, which is incident on the punched mirror 14, is reflected downward by the punched mirror 14 and is incident on the filter unit 28. After light having a predetermined wavelength is cut from the luminescent light L, the luminescent light L is incident on the photomultiplier 30 and is photoelectrically detected.

Sub-Scanning Mechanism S1 as Feed Mechanism

Next, a sub-scanning mechanism S1 as a "feed mechanism", which moves the substrate 40 (specifically, a scanning unit 70 including the substrate 40, see FIG. 5) in the sub-scanning direction, will be described.

In the following description, an arrow X shown in each drawing indicates one side in the X direction, an arrow Y indicates one side in the Y direction, and an arrow Z indicates one side in a Z direction. Further, a side opposite to the arrow X is referred to as the other side in the X direction, a side opposite to the arrow Y is referred to as the other side in the Y direction, and a side opposite to the arrow Z is referred to as the other side in the Z direction.

Figure 5:
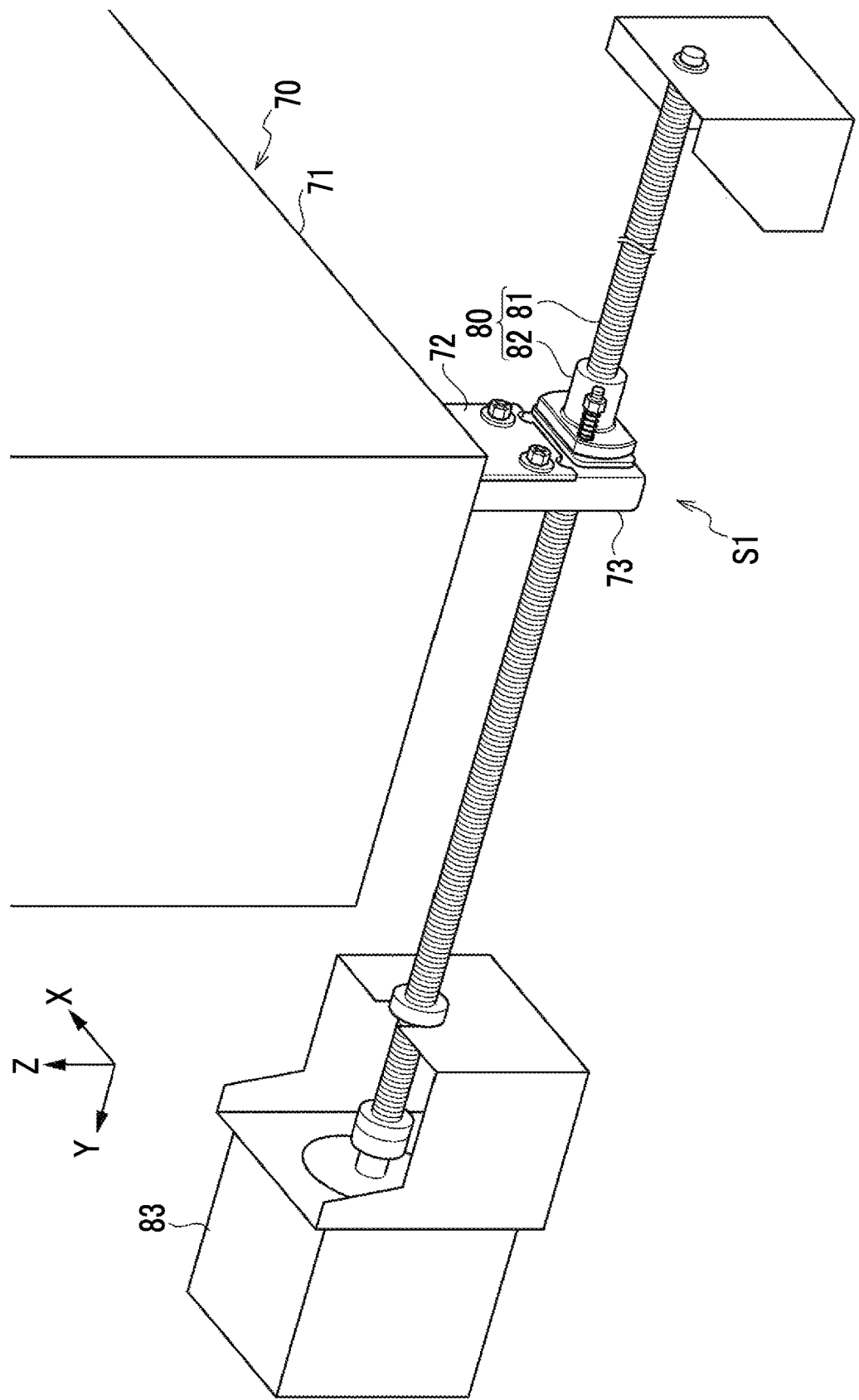
FIG. 5 is a perspective view showing the sub-scanning mechanism of the embodiment together with a scanning unit body.

As shown in FIG. 5, the sub-scanning mechanism S1 includes a feed screw 80. The feed screw 80 includes a screw shaft 81 and a nut 82. A motor 83 is provided on one side of the screw shaft 81 in the longitudinal direction of the screw shaft 81, and the screw shaft 81 is rotated by the motor 83. In this embodiment, the feed screw 80 is a ball screw and further includes a plurality of balls (not shown) between the screw shaft 81 and the nut 82.

Figure 2:
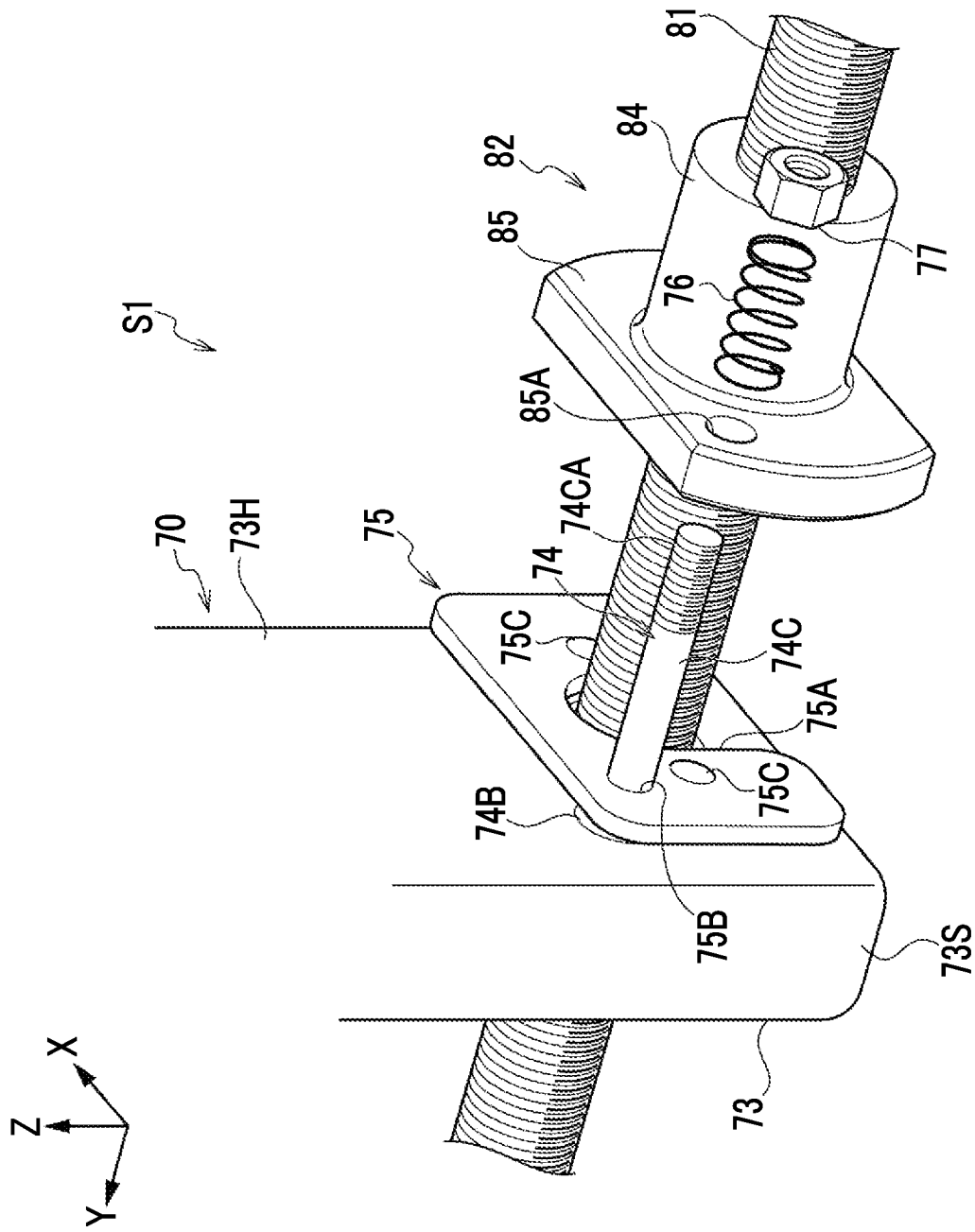
FIG. 2 is an exploded perspective view of the sub-scanning mechanism of the embodiment.
Figure 3:
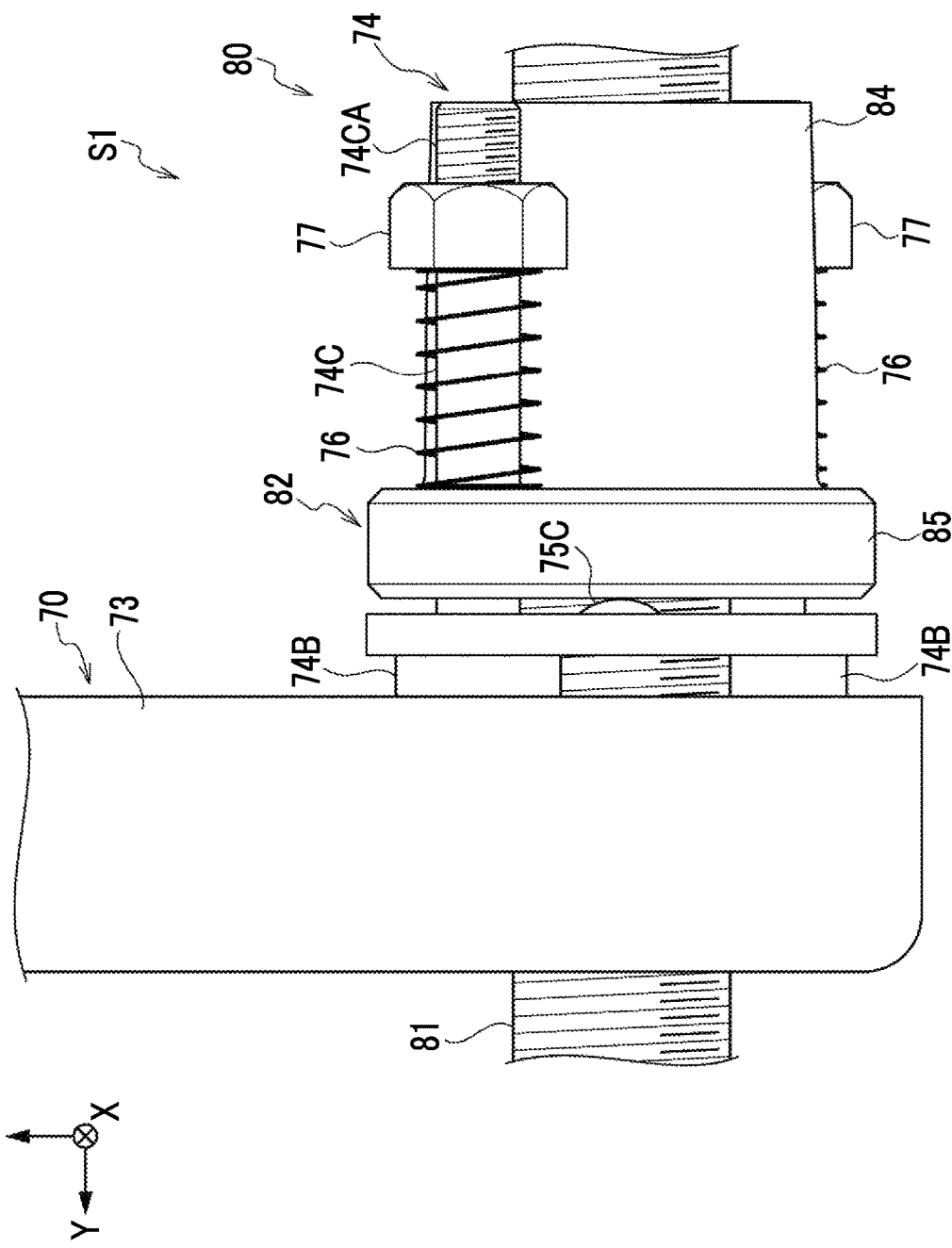
FIG. 3 is a side view of the sub-scanning mechanism of the embodiment.

As shown in FIG. 2, the nut 82 includes a cylindrical portion 84 and a plate portion 85. The cylindrical portion 84 is formed in the shape of a cylinder coaxial with the screw shaft 81. The plate portion 85 is formed on one side of the cylindrical portion 84 in an axial direction (one side of the cylindrical portion 84 in the Y direction), and is formed in a shape where the cylindrical portion 84 is increased in size in a radial direction. The plate portion 85 is formed in the shape of a plate of which the thickness direction is parallel to the direction of the screw shaft (Y direction). Specifically, the plate portion 85 is formed in the shape of a substantially rectangular plate of which the longitudinal direction is parallel to the X direction.

Figure 1:
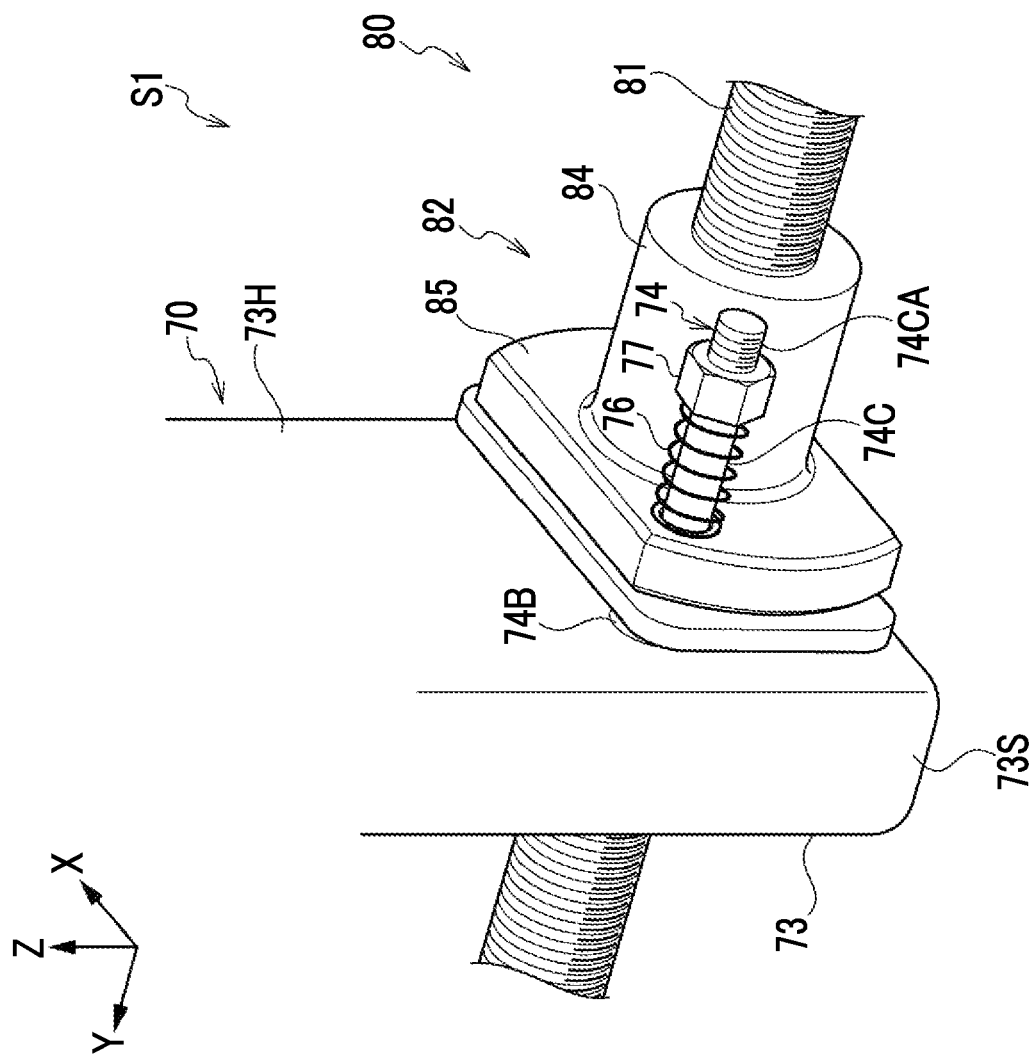
FIG. 1 is a perspective view of a sub-scanning mechanism of an embodiment.

Through-holes 85A through which rotation-preventing shafts 74 to be described later pass are formed in the plate portion 85. The through-holes 85A are bored through the plate portion 85, and two through-holes 85A are formed (in FIGS. 1 and 2, one of the two through-holes 85A is hidden by the cylindrical portion 84 of the nut 82). An imaginary straight line, which connects the two through-holes 85A, passes through the center of the screw shaft 81, and is inclined with respect to the X direction.

Further, the sub-scanning mechanism S1 includes a scanning unit 70 as a "moving body" that is moved by the feed screw 80. As shown in FIG. 5, the scanning unit 70 includes a scanning unit body 71, a nut-side member 73, and a connecting member 72 that connects the scanning unit body 71 to the nut-side member 73.

The scanning unit body 71 includes the substrate 40, the optical head 15, and the concave mirror 18 (see FIG. 12), and forms main component of the scanning unit 70. As shown in FIG. 5, the scanning unit body 71 is positioned above the feed screw 80 (on one side of the feed screw 80 in the Z direction). Both side portions of the scanning unit body 71 in the X direction are supported by a pair of rails (not shown) so that the scanning unit body 71 is linearly movable in the sub-scanning direction (Y direction).

Figure 4:
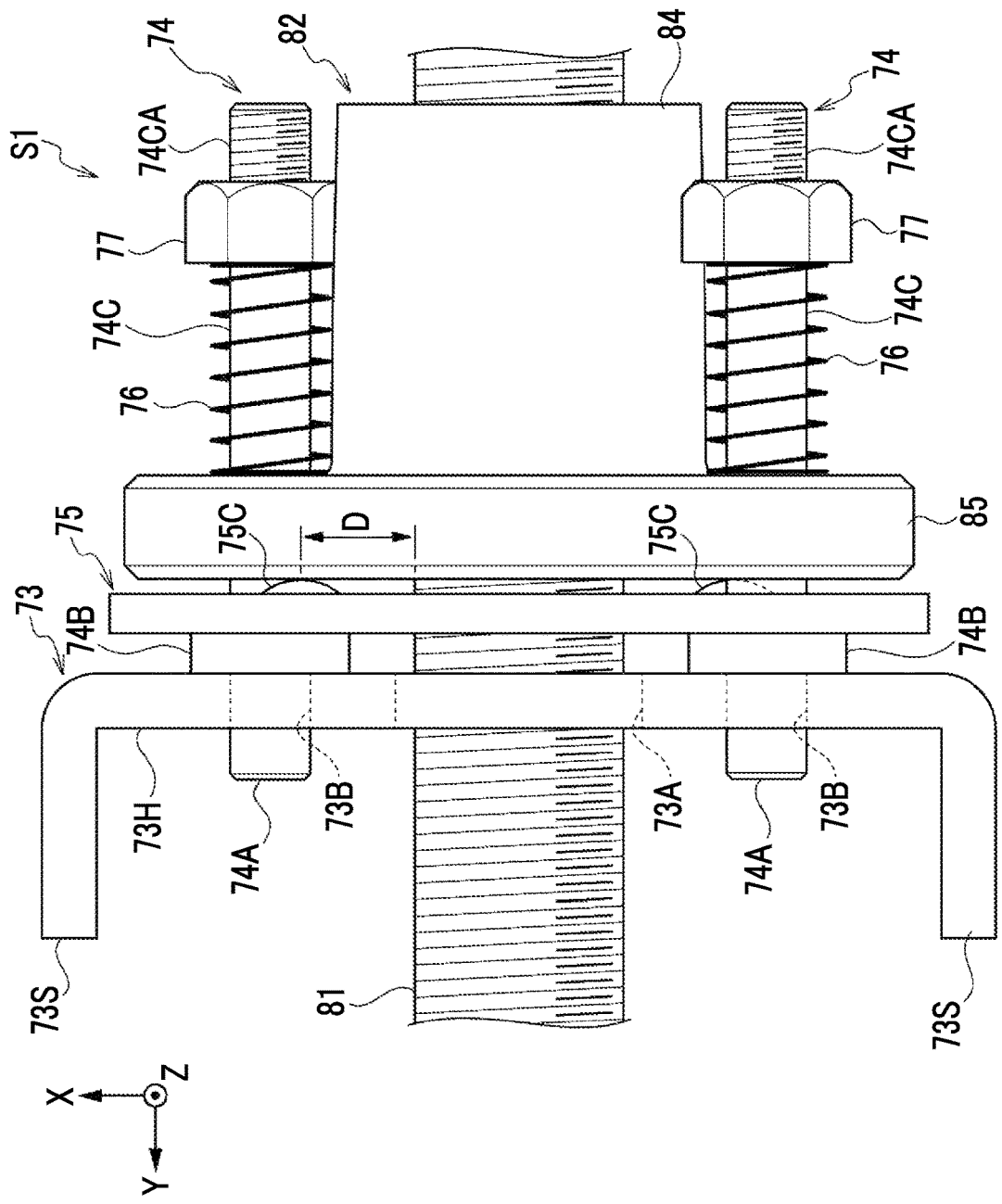
FIG. 4 is a plan view of the sub-scanning mechanism of the embodiment.

As shown in FIG. 4, the nut-side member 73 is formed in a substantially C-shape in plan view. That is, the nut-side member 73 includes a body plate portion 73H of which the thickness direction is parallel to the Y direction, and a pair of side plate portions 73S that extends toward one side in the Y direction from both ends of the body plate portion 73H in the X direction.

A through-hole 73A through which the screw shaft 81 of the feed screw 80 passes is formed in the nut-side member 73 (see FIG. 4). The through-hole 85A passes through the middle portion of the body plate portion 73H of the nut-side member 73 in a width direction of the body plate portion 73H (X direction).

Further, fixing holes 73B, which are used to fix the rotation-preventing shafts 74, are formed in the nut-side member 73 (see FIG. 4). Portions 74A to be fixed of the rotation-preventing shafts 74 are screwed with the fixing holes 73B, so that the rotation-preventing shafts 74 are fixed to the nut-side member 73.

The rotation-preventing shafts 74 protrude from the nut-side member 73 toward the other side in the Y direction so that the axial direction of each rotation-preventing shaft 74 is parallel to a direction parallel to the direction of the screw shaft 81. The rotation-preventing shaft 74 includes the portion 74A to be fixed, a seat portion 74B, and a shaft portion 74C in this order from one side toward the other side in the Y direction (toward the distal end side). Among them, the seat portion 74B and the shaft portion 74C protrude from the nut-side member 73 toward the other side in the Y direction.

The seat portion 74B is formed in the shape of a column of which the diameter is larger than the diameter of the portion 74A to be fixed. One surface of the seat portion 74B in the Y direction is in contact with the other surface of the body plate portion 73H of the nut-side member 73 in the Y direction.

The shaft portion 74C has the shape of a column of which the diameter is smaller than the diameter of the seat portion 74B, and is longer than the seat portion 74B in the axial direction. A screw portion 74CA on which external threads are cut is formed at the distal end portion of the shaft portion 74C (the other end portion of the shaft portion 74C in the Y direction).

Figure 7:
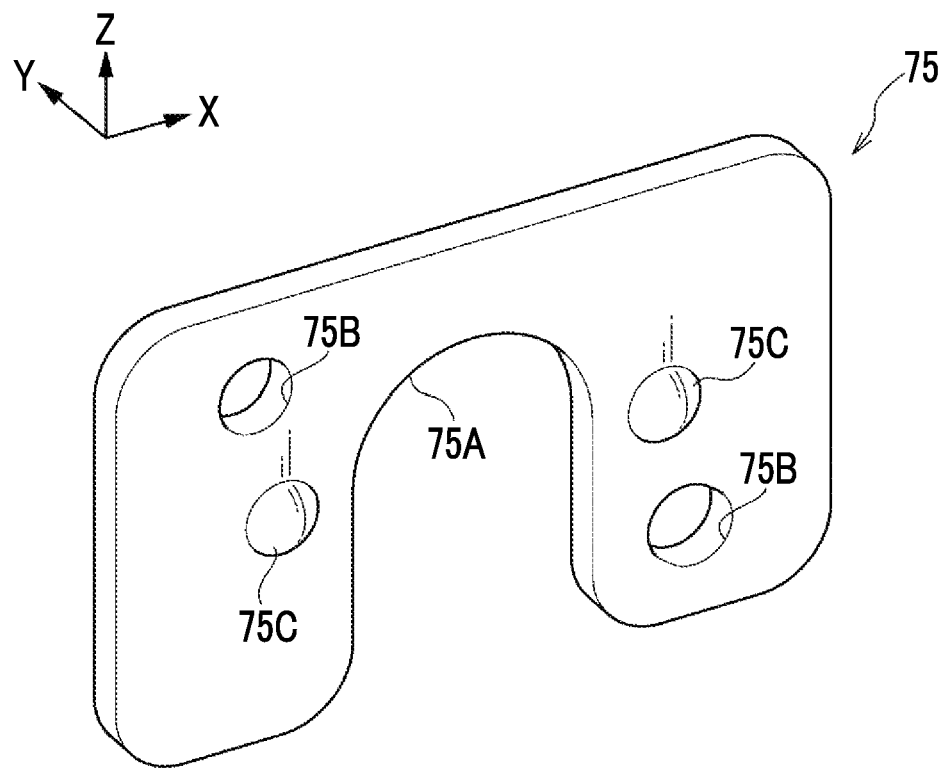
FIG. 7 is a perspective view of a push plate.

In addition, the scanning unit 70 includes a push plate 75. As shown in FIG. 7, the push plate 75 is made of metal and is formed in the shape of a plate by way of example.

A screw shaft-disposition portion 75A on which the screw shaft 81 of the feed screw 80 is disposed is formed at the push plate 75. Since the screw shaft-disposition portion 75A is formed in a shape where the middle portion of the lower side of the push plate 75 in the width direction (X direction) is cut out to the upper side, the screw shaft-disposition portion 75A is opened downward.

Further, shaft-insertion holes 75B through which the shaft portions 74C of the rotation-preventing shafts 74 pass are formed in the push plate 75. The shaft-insertion holes 75B pass through the push plate 75, and two shaft-insertion holes 75B are formed so as to correspond to the number of the rotation-preventing shafts 74. An imaginary straight line, which connects the two shaft-insertion holes 75B, passes through the center of the screw shaft 81, and is inclined with respect to the X direction. Further, the two shaft-insertion holes 75B are formed at positions that are symmetric with respect to the center of the screw shaft 81 in a case in which the shaft-insertion holes 75B are viewed in the axial direction.

Furthermore, convex portions 75C are formed on the push plate 75. The convex portions 75C are point-like convex portions, which are in point contact with the nut 82, and protrude toward one side in the thickness direction (the other side in the Y direction). Two convex portions 75C are formed. The shape of the convex portion 75C is a substantially spherical shape. An imaginary straight line, which connects the two convex portions 75C, passes through the center of the screw shaft 81, and is parallel to the X direction. In addition, the two convex portions 75C are formed at positions that are symmetric with respect to the center of the screw shaft 81 in a case in which the convex portions 75C are viewed in the axial direction.

As shown in FIG. 2, the shaft portions 74C of the rotation-preventing shafts 74 pass through the shaft-insertion holes 75B of the push plate 75 and one surface of the push plate 75 in the Y direction is in contact with the other surface of each seat portion 74B in the Y direction. In this state, the push plate 75 is fixed to the rotation-preventing shafts 74. Accordingly, the push plate 75 is integrated with the nut-side member 73 and the rotation-preventing shafts 74, and forms a part of the scanning unit 70. A gap corresponding to the length of the seat portion 74B of the rotation-preventing shaft 74 in the axial direction is formed between the body plate portion 73H of the nut-side member 73 and the push plate 75. Further, the convex portions 75C of the push plate 75 are disposed near the screw shaft 81 of the feed screw 80. It is preferable that a distance D (a distance perpendicular to the Y direction, see FIG. 4) between the surface of the screw shaft 81 and the apex of the convex portion 75C is 5 mm or less.

A portion of each shaft portion 74C, which protrudes from the push plate 75 toward the distal end side, passes through the through-hole 85A of the plate portion 85 of the nut 82.

The diameter of the shaft portion 74C is smaller than the diameter of the through-hole 85A of the nut 82. For this reason, the nut 82 can be inclined with respect to the rotation-preventing shafts 74 in a state in which the shaft portions 74C of the rotation-preventing shafts 74 pass through the through-holes 85A of the nut 82.

A spring 76 as an "elastic body" is mounted on a portion of each shaft portion 74C that protrudes from the plate portion 85 of the nut 82 toward the distal end side. In addition, a second nut 77 is screwed with the screw portion 74CA that is formed at the distal end portion of each shaft portion 74C. Accordingly, the spring 76 is disposed between the plate portion 85 of the nut 82 and the second nut 77 in a state in which the spring 76 is elastically compressed in the axial direction. For this reason, the elastic forces of the springs 76 act to push the scanning unit 70 (the convex portions 75C of the push plate 75) against the plate portion 85 of the nut 82. In other words, the elastic forces of the springs 76 act in a direction where the convex portions 75C and the nut 82 come into contact with each other.

Figure 8:
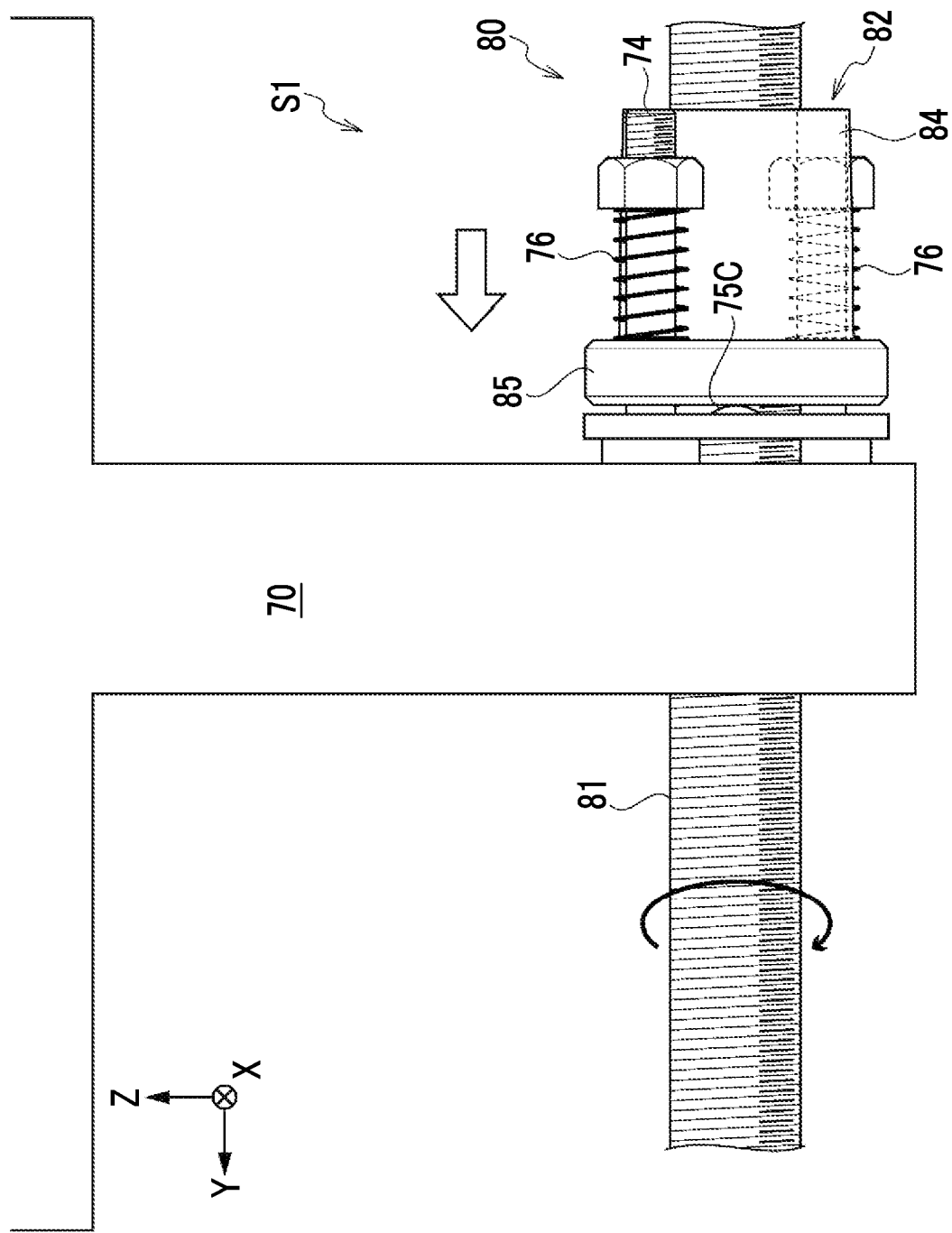
FIG. 8 is a side view showing a state in which a scanning unit is being moved toward one side in a Y direction.

In a case in which the screw shaft 81 is rotated as shown in FIG. 8 in the sub-scanning mechanism S1 having the above-mentioned structure, the nut 82 of which the rotation with respect to the scanning unit 70 is prevented by the rotation-preventing shafts 74 is linearly moved on the screw shaft 81 and the plate portion 85 of the nut 82 pushes the convex portions 75C of the push plate 75. As a result, the scanning unit 70 is moved toward one side in the Y direction.

Figure 9:
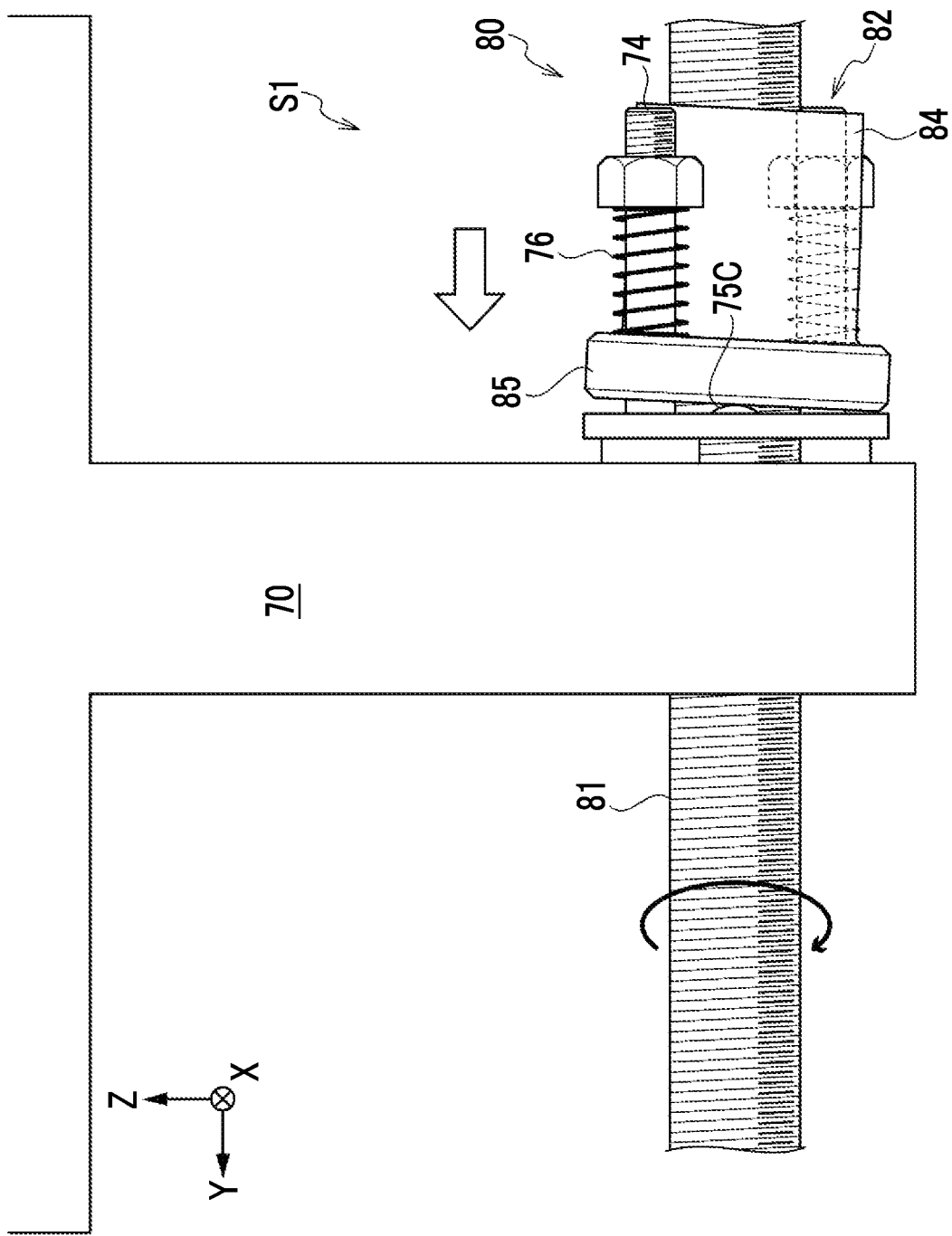
FIG. 9 is a side view showing a state in which a nut is inclined in FIG. 8.

Here, in a case in which the nut 82 is linearly moved on the screw shaft 81, the nut 82 may be inclined with respect to the screw shaft 81 as shown in FIG. 9 (an inclination shown in FIG. 9 is an inclination around an axis parallel to the X direction). Even in this case, since the nut 82 is in contact with only the convex portions 75C of the push plate 75 that are a part of the scanning unit 70, the inclination of the nut 82 does not affect the scanning unit 70. In other words, even though the nut 82 is slightly inclined, the scanning unit 70 is not inclined.

That is, since the two convex portions 75C are disposed on an imaginary straight line that passes through the center of the nut and is parallel to the X direction, the positional irregularities of portions of the nut 82, which are in contact with the convex portions 75C, in the Y direction can be suppressed even though an inclination around an axis parallel to the X direction shown in FIG. 9 occurs on the nut 82.

As described above, the scanning unit 70 is adapted to be moved by being pushed by the nut 82 through only the convex portions 75C. Specifically, a gap in the Y direction is formed between the push plate 75 of the scanning unit 70 and the plate portion 85 of the nut 82 at portions other than the convex portions 75C. For this reason, even though the nut 82 is slightly inclined, the scanning unit 70 is not pushed by the nut 82 through portions other than the convex portions 75C. Accordingly, the inclination of the nut 82 does not affect the scanning unit 70.

On the other hand, in a case in which the scanning unit 70 is to be moved toward the other side in the Y direction, the nut 82 is moved toward the other side in the Y direction by the reverse rotation of the screw shaft 81 and a force applied to the other side in the Y direction acts on the second nuts 77, which are screwed with the rotation-preventing shafts 74 through the springs 76. Accordingly, the scanning unit 70 is moved toward the other side in the Y direction.

Effects

Next, the effects of this embodiment will be described.

In this embodiment, the sub-scanning mechanism S1 includes the feed screw 80, which includes the screw shaft 81 and the nut 82, and scanning unit 70. Further, the nut 82 is moved on the screw shaft 81 by the rotation of the screw shaft 81, so that the scanning unit 70 is moved in the direction of the screw shaft.

Incidentally, in a case in which the nut 82 is moved on the screw shaft 81 by the rotation of the screw shaft 81, the nut 82 may be inclined with respect to the screw shaft 81. For this reason, since the inclination of the nut is transmitted to the moving body as it is in the case of an aspect where the scanning unit 70 is fixed to the nut 82, there is a concern that the accuracy of the feed position of the scanning unit 70 may deteriorate.

Accordingly, in this embodiment, the inclination of the scanning unit 70 with respect to the nut 82 is allowed in a case in which the scanning unit 70 is moved by the movement of the nut 82. For this reason, even in a case in which the nut 82 is inclined as shown in FIG. 9 during the movement of the nut 82 on the screw shaft 81, it is difficult for the scanning unit 70 to be affected by the inclination of the nut 82. As a result, feed irregularity caused by the inclination of the nut 82 can be suppressed.

In particular, the scanning unit 70 includes the convex portions 75C in this embodiment. Furthermore, the scanning unit 70 is moved in the direction of the screw shaft 81 by being pushed by the nut 82 through only the convex portions 75C. Accordingly, a structure (inclination-absorbing structure) in which the inclination of the scanning unit 70 with respect to the nut 82 is allowed in a case in which the scanning unit 70 is moved by the movement of the nut 82 is realized. For this reason, feed irregularity caused by the inclination of the nut 82 can be suppressed by a simple structure.

Furthermore, in this embodiment, two convex portions 75C are present and an imaginary straight line, which connects the two convex portions 75C, passes through the center of the screw shaft 81. For this reason, particularly, it is difficult for the inclination of the nut 82 around the imaginary straight line, which connects the two convex portions 75C, to affect the scanning unit 70. In addition, since the two convex portions 75C are positioned so as to be symmetric with respect to the center of the screw shaft 81 in a case in which the convex portions 75C are viewed in the axial direction, the nut 82 and the scanning unit 70 act and react on each other at positions that are symmetric with respect to the center of the screw shaft 81 in a case in which the convex portions 75C are viewed in the axial direction. Accordingly, the inclination of the nut 82, which is caused by a reaction from the scanning unit 70, can be suppressed.

Further, in this embodiment, the "moving body" is the scanning unit 70, the scanning unit 70 is moved in the sub-scanning direction by movement using the feed screw 80, the scanning unit 70 includes the optical head 15 that is moved inside the scanning unit 70 in the main scanning direction, and the two convex portions 75C are positioned so as to be arranged in the main scanning direction. For this reason, lateral irregularity can be suppressed.

Figures 6A, 6B:
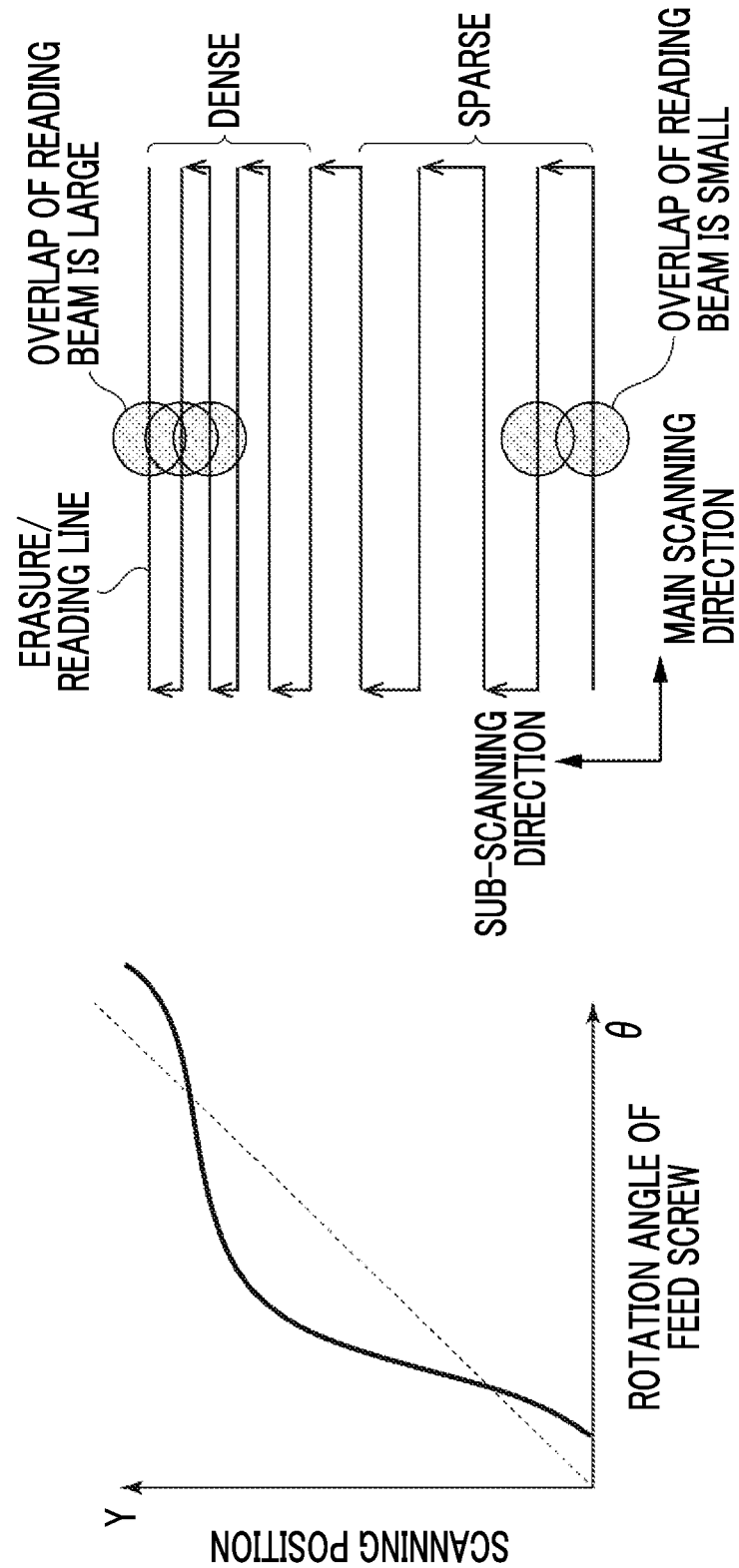
FIGS. 6A and 6B are diagrams illustrating that lateral irregularity occurs due to feed irregularity caused by the inclination of a nut in a case in which an image is read through main scanning and sub-scanning.

Here, lateral irregularity will be described in detail with reference to FIGS. 6A and 6B.

For example, in a case in which the image carrier 21 is an imaging plate, energy stored in the imaging plate is secondarily excited by specific laser beams and is taken out as stimulable luminescent light and the stimulable luminescent light is read and is imaged as a signal. Energy stored at a portion from which the signal is obtained is significantly reduced for the reason that read and erasures are simultaneously performed. Here, in a case in which a shake shown in FIG. 6A occurs at a scanning position of the scanning unit 70 in the sub-scanning direction due to the unspecified inclination of the nut of the feed screw of the sub-scanning mechanism S1, a dense portion where erasure lines and reading lines are close to each other and a sparse portion where erasure lines and reading lines are distant from each other are formed as shown in FIG. 6B. Since the erasure lines are partially reread at the dense portion, read signals are reduced. On the other hand, since the spot of a reading laser beam less overlaps a previous scanning line (a line having been erased) at the sparse portion, read signals are increased. As a result, irregularity occurs at some positions in the sub-scanning direction and the lateral irregularity occurs.

Further, since the optical head 15 of the scanning unit 70 is positioned above the nut 82 in this embodiment, feed irregularity in the Y direction (sub-scanning direction) is increased in a case in which the inclination of the nut 82 around an axis parallel to the X direction is transmitted to the scanning unit 70. Further, the two convex portions 75C are arranged in the X direction (main scanning direction) in this embodiment. For this reason, it is difficult for the inclination of the nut 82 around an axis parallel to the X direction to affect the scanning unit 70. As a result, feed irregularity in the Y direction (sub-scanning direction) can be effectively suppressed.

Furthermore, in this embodiment, the sub-scanning mechanism S1 further includes the springs 76 that make elastic forces act in a direction where the nut 82 and the scanning unit 70 come into contact with each other at the convex portions 75C. For this reason, since a state in which the nut 82 and the scanning unit 70 are in contact with each other at the convex portions 75C is likely to be kept, it is possible to suppress an impact against the scanning unit 70 that is caused in a case in which the nut 82 comes into contact with the scanning unit 70 from a state in which the nut 82 is not in contact with the scanning unit 70.

Further, in this embodiment, the scanning unit 70 includes the rotation-preventing shafts 74 that prevent the rotation of the nut 82 relative to the scanning unit 70, and the spring 76 is disposed around each of the rotation-preventing shafts 74. For this reason, the number of components can be made smaller than that in an aspect where components used to dispose the springs 76 at positions separate from the rotation-preventing shafts 74 are provided.

Furthermore, in this embodiment, two rotation-preventing shafts 74, which are provided with the springs 76, are present and are provided so as to be symmetric with respect to the center of the nut 82. For this reason, since the elastic forces of the springs 76 can be made to act on the nut 82 and the scanning unit 70 in balance, the relative postures of the nut 82 and the scanning unit 70 are stabilized.

Further, a direction in which the two convex portions 75C are arranged (a direction parallel to the X direction) and a direction in which the two springs 76 are arranged (a direction inclined with respect to the X direction) cross each other in this embodiment.

For this reason, the two springs 76 are adapted to make elastic forces act in both two directions in which the nut 82 is inclined while being in contact with the two convex portions 75C (an inclination in a positive direction around an X axis and an inclination in a negative direction around the X axis). Accordingly, the angle of the nut 82 with respect to the scanning unit 70 is stabilized.

Modification Example

Next, a sub-scanning mechanism S2 according to a modification example will be described with reference to FIGS. 10 and 11. The same portions as those of the embodiment are denoted by the same reference numerals as those of the embodiment, and the detailed description thereof (also including common actions) will be appropriately omitted.

An aspect where the scanning unit 70 is pushed by the nut 82 through the convex portions 75C in a case in which the scanning unit 70 is to be moved toward one side in the Y direction has been described in the embodiment. In contrast, in the modification example, the scanning unit 70 is adapted to be pushed by a nut (an opposite nut 182) through only convex portions (opposite convex portions 175C) not only in a case in which the scanning unit 70 is to be moved toward one side in the Y direction but also in a case in which the scanning unit 70 is to be moved toward the other side in the Y direction.

Figure 10:
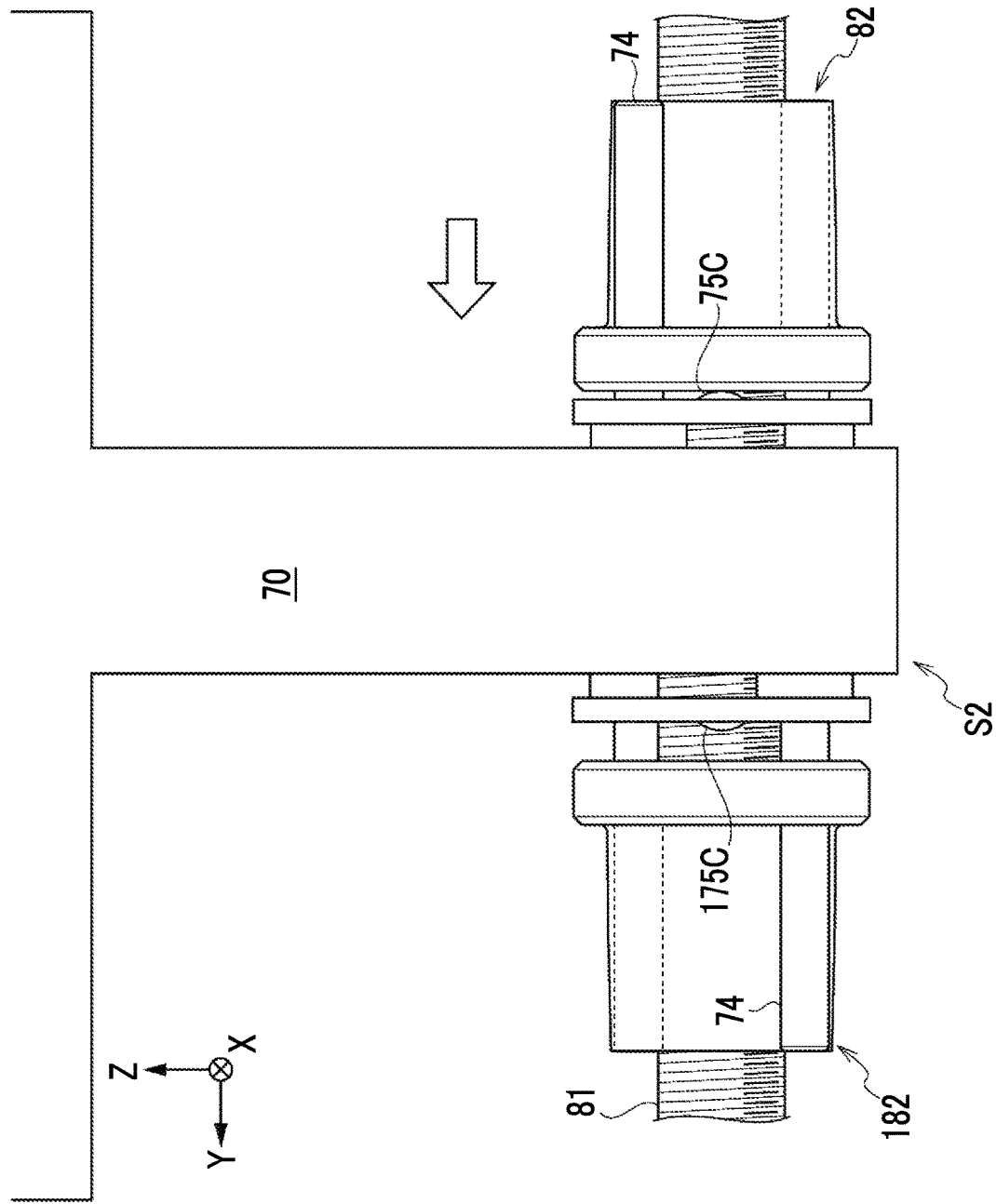
FIG. 10 is a side view of a sub-scanning mechanism of a modification example.
Figure 11:
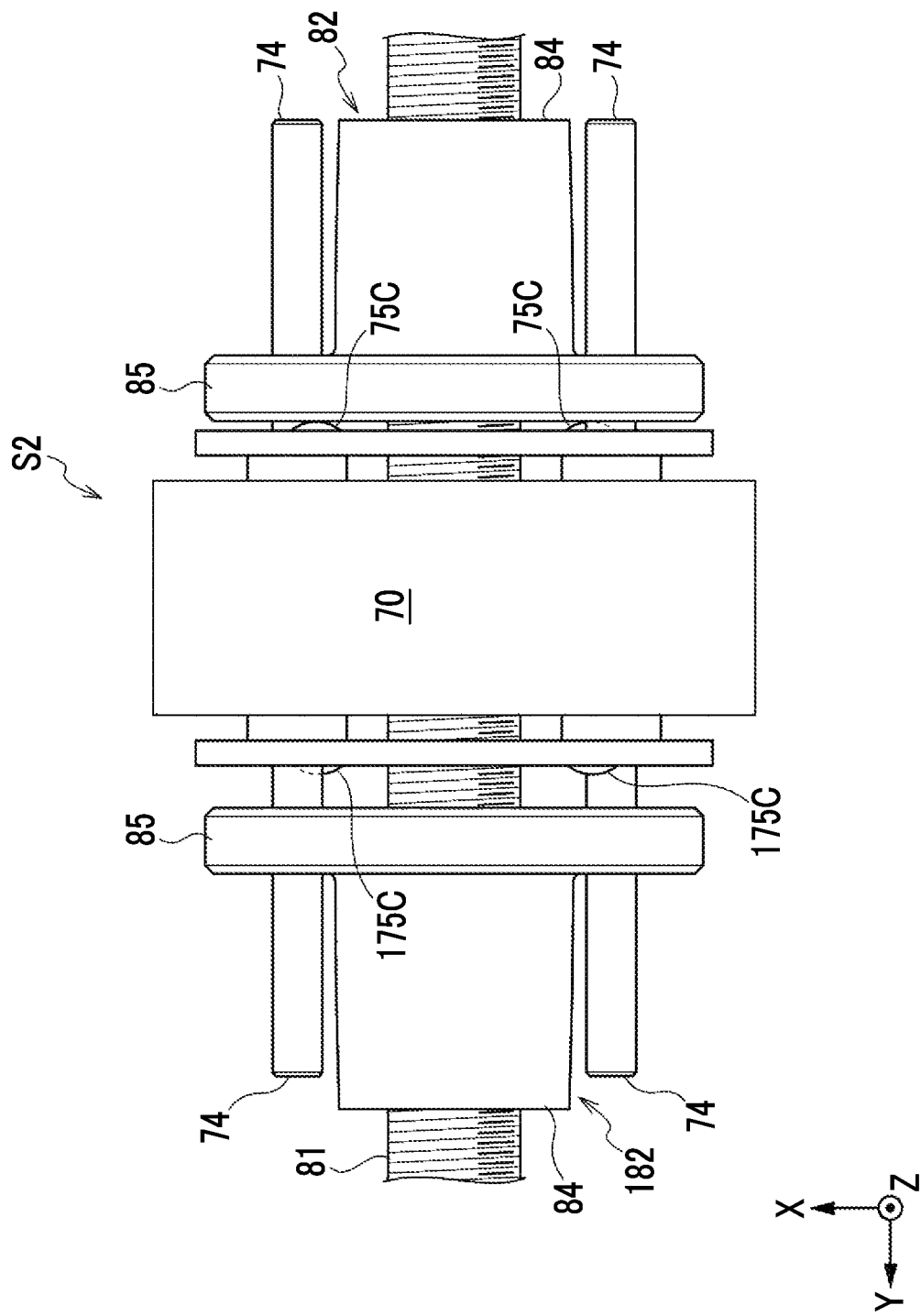
FIG. 11 is a plan view of the sub-scanning mechanism of the modification example.

As shown in FIGS. 10 and 11, the nut 82 pushes the scanning unit 70 through the convex portions 75C in a case in which the scanning unit 70 is to be moved toward one side in the Y direction. In this case, a distance between the nut 82 and the opposite nut 182 on the screw shaft 81 in the Y direction is set so that the opposite nut 182 is not in contact with the opposite convex portions 175C. As shown in FIGS. 10 and 11, the sub-scanning mechanism S2 of the modification example does not include the springs 76 and the second nuts 77 of the embodiment.

Although not shown, the opposite nut 182 pushes the scanning unit 70 to the other side in the Y direction through the opposite convex portions 175C in a case in which the scanning unit 70 is to be moved toward the other side in the Y direction. In this case, the nut 82 is not in contact with the convex portions 75C with a gap therebetween.

In the sub-scanning mechanism S2 of the modification example, it is possible to suppress feed irregularity not only in a case in which the scanning unit 70 is to be moved toward one side in the Y direction but also in a case in which the scanning unit 70 is to be moved toward the other side in the Y direction. Accordingly, the sub-scanning mechanism S2 can be suitably used in an image reading device that not only reads an image in a case in which the scanning unit 70 is moved toward one side in the Y direction but also reads an image in a case in which the scanning unit 70 is moved toward the other side in the Y direction.

Supplementary Description

The feed mechanism S1 according to the embodiment has been described above with reference to the drawings, but the feed mechanism according to this embodiment is not limited to the feed mechanism shown in the drawings and can be appropriately changed in design without departing from the scope of the invention.

Further, an example where the convex portions 75C are formed on the push plate 75 forming a part of the scanning unit 70 (moving body) so that the moving body includes the convex portions 75C has been described in the embodiment, but the invention is not limited thereto. For example, the push plate 75 may not be provided and the convex portions 75C may be formed on the body plate portion 73H of the nut-side member 73.

Further, an example where two convex portions 75C are present has been described in the embodiment, but the invention is not limited thereto. An aspect where only one convex portion 75C is present may be provided. The reason for this is that the inclination of the scanning unit 70 with respect to the nut 82 is allowed to some extent in a case in which the scanning unit 70 is moved by the movement of the nut 82 even though, for example, one of the two convex portions 75C of the embodiment is removed.

Furthermore, an example where the convex portions 75C are point-like convex portions has been described in the embodiment, but the invention is not limited thereto. For example, the convex portions may be linear convex portions that are in line contact with the nut. In this case, it is preferable that the convex portions may be linear convex portions extending on an imaginary straight line passing through the center of the screw shaft (the center of the nut).

Moreover, an example where the convex portions 75C have a spherical shape has been described in the embodiment, but the invention is not limited thereto. For example, the convex portions may have a conical or may have a pyramid shape.

Further, an example where the moving body includes the convex portions has been described in the embodiment, but the invention is not limited thereto. For example, the example described in the embodiment may be changed to an aspect where the convex portions 75C are formed on the plate portion 85 of the nut 82 so that the nut 82 includes the convex portions. In this case, the convex portions 75C of the push plate 75 may be omitted and the convex portions of the nut 82 may be adapted to be in contact with the flat surface of the push plate 75. Furthermore, the push plate 75 may be omitted and the convex portions of the nut 82 may be adapted to be in contact with the body plate portion of the nut-side member 73.

Moreover, an example where the feed screw 80 is a ball screw has been described in the embodiment, but the invention is not limited thereto. For example, the feed screw may be a sliding screw and may be a planetary roller screw.

Further, an example where the feed mechanism is applied to the sub-scanning mechanism S1 performing the sub-scanning of the optical head 15 in the image reading device 110 has been described in the embodiment, but the invention is not limited thereto.

Furthermore, an example where the connecting member 72 is connected to the other end portion of the scanning unit body 71 in the X direction and transmits a load applied from the feed screw 80 to the other end portion of the scanning unit 70 in the X direction has been described in the embodiment, but the invention is not limited thereto. For example, the connecting member 72 may be connected to the middle portion of the scanning unit body 71 in the width direction (X direction) to transmit a load, which is applied from the feed screw 80, to the middle portion of the scanning unit 70 in the width direction (X direction).

EXPLANATION OF REFERENCES

70: scanning unit (moving body)
74: rotation-preventing shaft
75C: convex portion
76: spring (elastic body)
80: feed screw
81: screw shaft
82: nut

What is claimed is:

1. A feed mechanism comprising:
a feed screw that includes a screw shaft and a nut; and
a moving body,
wherein the nut is moved on the screw shaft by a rotation of the screw shaft, so that the moving body is moved in a direction of the screw shaft,
the moving body or the nut includes a convex portion,
a contact portion of the convex portion is in point contact or in line contact with the nut or the moving body which is engaged with the convex portion,
the moving body is pushed by the nut through only the convex portion to allow an inclination of the moving body with respect to the nut in a case in which the moving body is moved by a movement of the nut, wherein two convex portions are present, and the two convex portions and a central longitudinal axis of the screw shaft are arranged collinearly, and wherein the moving body is a scanning unit including an optical head, the scanning unit is moved in a sub-scanning direction by a movement using the feed screw, and the two convex portions are positioned so as to be arranged in a main scanning direction that is perpendicular to the sub-scanning direction.

2. The feed mechanism according to claim 1, wherein a distance between a surface of the screw shaft and an apex of the convex portion is 5 mm or less.

3. The feed mechanism according to claim 2, wherein the two convex portions are positioned so as to be symmetric with respect to the center of the screw shaft in a case in which the convex portions are viewed in an axial direction.

4. The feed mechanism according to claim 3, further comprising:

an elastic body that forces the nut against the moving body at the convex portions along the direction of the feed screw.

5. The feed mechanism according to claim 2, further comprising:

an elastic body that forces the nut against the moving body at the convex portions along the direction of the feed screw.

6. The feed mechanism according to claim 1, wherein the two convex portions are positioned so as to be symmetric with respect to the center of the screw shaft in a case in which the convex portions are viewed in an axial direction.

7. The feed mechanism according to claim 6, further comprising:

an elastic body that forces the nut against the moving body at the convex portions along the direction of the feed screw.

8. The feed mechanism according to claim 1, further comprising:

an elastic body that forces the nut against the moving body at the convex portions along the direction of the feed screw.

9. The feed mechanism according to claim 8, wherein the moving body includes a rotation-preventing shaft that prevents a rotation of the nut relative to the moving body, and the elastic body is disposed around the rotation-preventing shaft.

10. The feed mechanism according to claim 9, wherein two rotation-preventing shafts are present, and the two rotation-preventing shafts are provided so as to be symmetric with respect to a center of the nut.

11. The feed mechanism according to claim 1, further comprising:

an elastic body that forces the nut against the moving body at the convex portion along the direction of the feed screw, wherein the two convex portions are positioned so as to be symmetric with respect to the center of the screw shaft in a case in which the convex portions are viewed in the axial direction, the moving body includes a rotation-preventing shaft that prevents a rotation of the nut relative to the moving body, the elastic body is disposed around the rotation-preventing shaft, two rotation-preventing shafts are present, the two rotation-preventing shafts are provided so as to be symmetric with respect to a center of the nut, and a direction in which the two convex portions are arranged and a direction in which the two rotation-preventing shafts are arranged cross each other.

12. The feed mechanism according to claim 1, wherein the contact portion of the convex portions are in contact with a flat surface of the nut or the moving body which is engaged with the convex portion.

13. The feed mechanism according to claim 1, wherein the moving body is pushed by the nut through only the convex portions to allow an inclination of the moving body with respect to the nut in a case in which the moving body is moved by a movement of the nut, the moving body contacting with the nut in a state that the contact portion of the convex portions keep contact with the nut or the moving body.

14. The feed mechanism according to claim 1, wherein the contact portion of the convex portions are arranged in a line.

15. The feed mechanism according to claim 14, wherein the line that the contact portion of the convex portions is arranged crosses the feed screw.

16. The feed mechanism according to claim 1, wherein the convex portions are fixed to the moving body or the nut.

* * * * *